Aug. 24, 1926.
G. MANIERRE
1,597,239
TRAVELING CONVEYER
Filed July 14, 1922
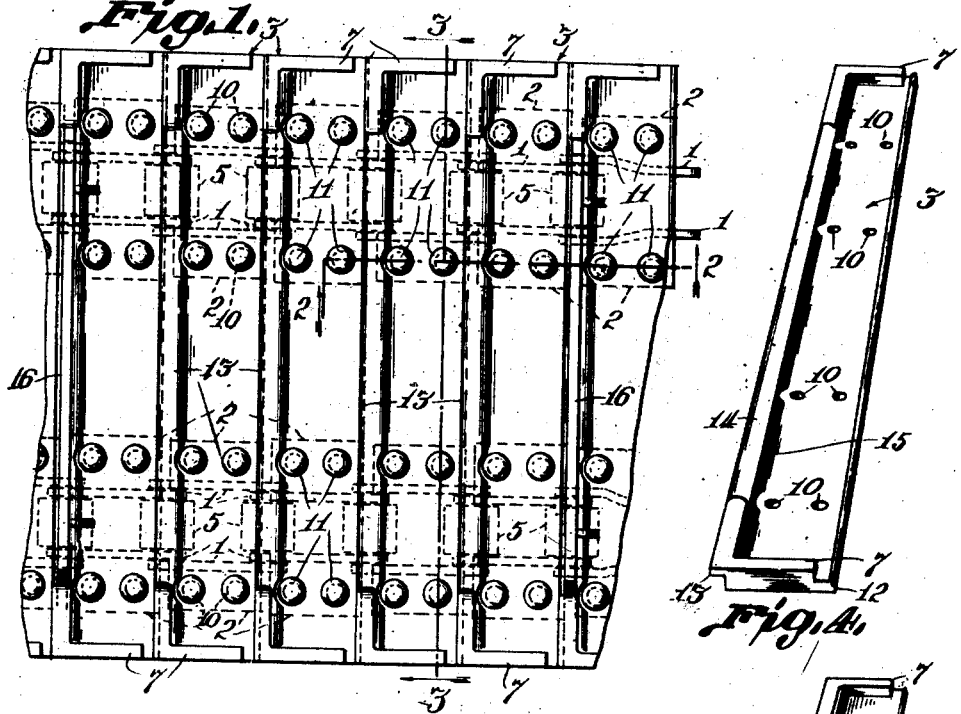
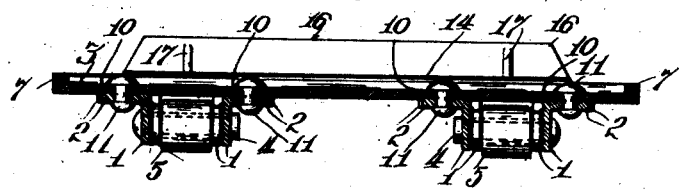
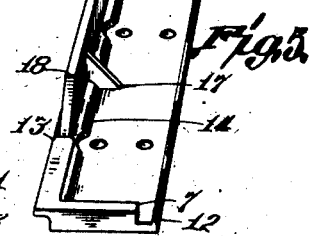
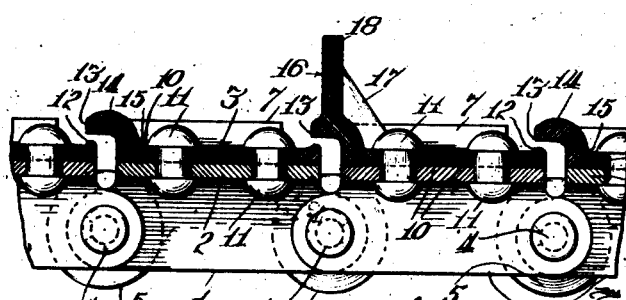
Inventor.
George Manierre Patented Aug. 24, 1926.

1,597,239

UNITED STATES PATENT OFFICE.

GEORGE MANIERRE, OF MILWAUKEE, WISCONSIN.

TRAVELING CONVEYER.

Application filed July 14, 1922. Serial No. 575,064.

This invention relates to improvements in traveling conveyers.

It is an object of the invention to provide an endless conveyer with transverse members or aprons which are in mutual overlapping relation and to improve the construction of these aprons so as to lengthen the useful life thereof, and also to prevent the escape of the material to be carried through the interspace between adjacent aprons.

It is also an object of the invention to provide an apron of this kind which—without being unduly enlarged in width—presents suitable space for the attachment of a larger number of fasteners which secure the aprons to the links of the chain of the conveyer, preventing thereby the loosening of these aprons from the links, enhancing the efficiency and lengthening the life of the entire conveyer.

It is furthermore an object of the invention to provide an apron of this kind which is reinforced at both of its longitudinal edges so as to present portions of heavier cross-section at those points at which injurious friction may be encountered, and to prevent bending of these plates.

The invention also has the object of rendering the manufacture of these conveyers more economical by utilizing material which upon the formation into an apron may directly be provided with holes for receiving rivets or other fasteners through which the aprons are connected with the links of the chain instead of requiring drilling or punching operations for the reception of these rivets.

It is furthermore an object of the invention to unite elements or cleats projecting at an angle to the apron plates integrally with these plates and to arange integral reinforcing braces or struts between these cleats and the plates themselves.

With these and numerous other objects in view, an embodiment of the invention is illustrated in the accompanying drawing to which reference is made in the following specification.

In the drawing:

Fig. 1 is a top plan view on a portion of a conveyer with the improved apron plate;

Fig. 2 is a fragmentary longitudinal section on a larger scale, on the line 2—2 of Fig. 1;

Fig. 3 is a transverse section on the line 3—3 of Fig. 1;

Fig. 4 illustrates perspectively one of the aprons; and

Fig. 5 shows another one of these aprons provided with an angle cleat.

The conveyer chain is formed of links 1 of an approved construction, these links being provided near their top edges with angular flanges 2 to which the aprons 3 are secured. The links are interconnected by pintles 4 serving for rotatably receiving rollers 5 on which the conveyer may be supported at intervals in a well known way. While the conveyer chain is being shown as constructed in this way, it is obvious that any other desired construction for the chain itself may be used as long as it provides means for the attachment of the aprons to the individual links.

The aprons 3 formerly consisted of plates of rolled steel or the like which had to be drilled or punched to receive the fastening elements for connecting them with the links of the chain. In order to provide a proper overlapping relation between longitudinal margins of adjacent apron steel plates, these margins were both beaded or raised, and the raised portions were curved transversely of the conveyer. Between the beaded portions or margins of each of these former plates space was left for the attachment of one transverse row of rivets connecting them with the links.

The improved chain comprises apron plates 3 of cast material, thereby rendering it possible to apply the bead or its equivalent formation without necessitating an operation subsequent to the casting operation. The manufacture of these apron plates from cast material renders it possible to provide the marginal portions with enlargements 7, thereby strengthening the plates against bending strains and owing to the reinforcement on these margins, even upon excessive friction between adjacent plates, the life of the plate proper will not be unduly shortened. The manufacture from cast metal also renders it possible to introduce during the casting operation cores into portions of the mold, producing thereby the cast article provided with openings in which the rivets for connecting the plates to the links may be inserted.

As may be seen from Figs. 1 to 4 the apron plates proper comprise the plate portions having openings 10 which are arranged in pairs transversely of the longitudinal direction of the plates (or longitudinally of the conveyer), the space for the reception of the fasteners 11 being relatively large, as the overlapping portions can be made smaller and stronger in cross-section than in steel plates. The plates are provided at one edge with longitudinal enlargements 12 and at the other end with angular extensions 13 which in the assembly of the plates on the chain enter into overlapping relation with the reinforcements of adjacent plates. These angular enlargements 13, however, are themselves reinforced, as indicated at 14, and are provided with fillets 15 merging from the apex of the angular extension into the horizontal flat surface of the plate proper.

In order to enhance the efficiency of the entire chain certain of the apron plates spaced at predetermined intervals from each other as, for instance, every fourth or fifth plate, are provided with an angle cleat 16. These angle cleats were formerly made of rolled material and riveted to the flat bars which constituted the apron plates. In the improved construction the angle bars 16 are also made integral with the plates forming a single casting and being braced with respect to the apron plates by struts or bracing webs 17 which extend at a slant between the horizontal portion of the apron plate and the cleat.

It will also be seen that each of the plates is provided with raised marginal portions 18 along the transverse edges thereof, these marginal portions also merging into the enlargements 13 at the rear edges of the plates and the transverse marginal raised portions 18 effectively serve to prevent the discharge of the material laterally of the apron plates during the operation. The provision of these lateral enlargements, which act as guards against lateral discharge, also enhances the value of the individual plates as compared with the known plates of rolled flat steel.

The new article of manufacture consisting of the apron plates preferably is made of malleable cast iron which has the advantage that a heavier section can readily be used at the overlapping portion to increase thereby the strength without adding to the weight. Owing to the increase of the width of these cast aprons compared with the aprons of rolled material as formerly made, the arrangement of several sets of two rivets in each plate, the sets being spaced transversely and the rivets in each set being spaced longitudinally of the conveyer, eliminates the necessity of frequent repairs which were called for in known plates owing to the relatively few fasteners with which the plates were connected to the links. The manufacture of cast plates also is cheaper for the reasons stated above, inasmuch as the rivet holes can be made during the casting operations, and as the overlapping portions may be produced during the casting; the angle cleats also may be cast integral with the plates, avoiding the necessity of riveting these cleats to the finished plates. Malleable iron also resists rust to a higher degree than structural iron, and the bearing surfaces are enlarged in cast plates at each edge without additional expense.

Numerous apron plates were designed to prevent fine coal or similar material from entering between overlapping portions and thereby gradually wearing down these portions to such reduced cross-section that the operation of the chain suffered. By initially enlarging the wearing portions, this danger is entirely avoided and the life of the plate is therefore considerably lengthened.

I claim:

1. As a new article of manufacture, a conveyer apron comprising a plate portion, and reinforced portions extending along the longitudinal edges of the plate portion.

2. As a new article of manufacture, a conveyer apron comprising a plate portion and reinforced portions along the longitudinal margins of said plate portion, one of said portions being provided with an extension projecting angularly from the plate portion and having a continuation substantially parallel to the plate portion.

3. As a new article of manufacture, a conveyer apron comprising a plate portion having longitudinal reinforced portions of a cross-section heavier than that of the plate along its margin and a plurality of openings in said plate portion, said openings being arranged in pairs transversely of the longitudinal portions.

4. As a new article of manufacture, a conveyer apron comprising a plate portion, longitudinal marginal reinforcing portions, a cleat integral with the plate portion, and braces extending from said cleat to the plate portion.

5. As a new article of manufacture, a conveyer apron consisting of a plate and comprising longitudinal enlarged reinforcing portions along the margins of the plate, and transverse marginal flanges adapted to prevent the discharge of material laterally of the conveyer apron.

In testimony whereof, I affix my signature at 207 Wells Street, Milwaukee, Wisconsin.

GEORGE MANIERRE.